(12) United States Patent
Feldman et al.

(10) Patent No.: US 10,495,951 B1
(45) Date of Patent: Dec. 3, 2019

(54) SYSTEM AND METHOD FOR SUPPORTING VIDEO AND FILM RECORDING DEVICES

(71) Applicants: Jesse Michael Feldman, Los Angeles, CA (US); Adam Daniel Teichman, Los Angeles, CA (US)

(72) Inventors: Jesse Michael Feldman, Los Angeles, CA (US); Adam Daniel Teichman, Los Angeles, CA (US)

(*) Notice: Subject to any disclaimer, the term of this patent is extended or adjusted under 35 U.S.C. 154(b) by 0 days.

(21) Appl. No.: 16/155,517

(22) Filed: Oct. 9, 2018

Related U.S. Application Data

(60) Provisional application No. 62/669,914, filed on May 10, 2018.

(51) Int. Cl.
*G03B 17/56* (2006.01)
*F16M 13/04* (2006.01)
*F16M 11/04* (2006.01)

(52) U.S. Cl.
CPC ......... *G03B 17/561* (2013.01); *F16M 11/041* (2013.01); *F16M 13/04* (2013.01); *G03B 17/563* (2013.01)

(58) Field of Classification Search
None
See application file for complete search history.

(56) References Cited

U.S. PATENT DOCUMENTS

| | | | | |
|---|---|---|---|---|
| 4,083,480 A * | 4/1978 | Lee | ......................... | F16M 13/04 224/185 |
| 4,244,500 A * | 1/1981 | Fournier | ................... | A45F 5/00 224/201 |
| 5,305,034 A * | 4/1994 | Aratani | .................. | F16M 13/04 224/265 |
| 5,787,317 A * | 7/1998 | Robinson, Sr. | ........ | F16M 13/04 396/420 |
| 2002/0134896 A1* | 9/2002 | Hunter | ................... | F16M 13/04 248/118 |
| 2003/0173383 A1* | 9/2003 | Greene | .................. | F16M 13/04 224/265 |
| 2004/0211799 A1* | 10/2004 | Loughman | ............. | F16M 13/04 224/262 |
| 2010/0254696 A1* | 10/2010 | McKay | .................. | F16M 13/04 396/420 |
| 2014/0099092 A1* | 4/2014 | Di Leo | ................ | G03B 17/563 396/420 |
| 2015/0048134 A1* | 2/2015 | Fawcett | ................. | F16M 13/04 224/576 |
| 2018/0299751 A1* | 10/2018 | Teichman | ............ | G03B 17/561 |
| 2018/0343377 A1* | 11/2018 | Zeng | ........................ | G03B 5/00 |

* cited by examiner

*Primary Examiner* — William B Perkey
(74) *Attorney, Agent, or Firm* — Scott R. Hansen; Viking IP Law

(57) ABSTRACT

An apparatus for supporting a video camera on the shoulder of a camera operator shifts the weight of the camera away from the shoulder area and to a portion or portions of the body better adapted to bear weight, such as at the waist. The apparatus may have a false shoulder on which the camera rests, preferably without securing the camera to the upper surface of the false shoulder to allow for freedom of camera movement. One or more support struts transfer weight from the false shoulder to the other portion of the body.

16 Claims, 8 Drawing Sheets

SYSTEM AND METHOD FOR SUPPORTING VIDEO AND FILM RECORDING DEVICES

RELATED APPLICATIONS

This application claims priority from U.S. Provisional Patent Application No. 62/669,914, filed on May 10, 2018 and entitled "System and Method for Supporting Video and Film Recording Devices."

FIELD OF THE INVENTION

The present invention relates to supporting video and film cameras (collectively "video cameras" herein) and, in particular, to an apparatus and method for supporting a camera on the shoulder.

BACKGROUND

Professional-quality handheld video cameras can be quite heavy. In the film and television industry, cameras that are mounted on the shoulder can put considerable load on the shoulder and/or spine of the operator. While the weight of the combination of a camera, a lens and accessories may vary from project to project, it is not uncommon for the combined weight to fall in the range of 20-40 lbs or more.

An operator who uses such equipment for many hours per day may experience damage to the operator's body, sometimes permanently. For example, it is not unusual for an operator to suffer from major back/spine issues after years of prolonged handheld camerawork.

Consequently, there is a need in the art for a system and method for reducing the load that a handheld camera places on the back of the camera operator.

BRIEF SUMMARY OF THE INVENTION

An apparatus for supporting the weight of a video camera comprises a false shoulder having an upper surface and a lower surface. At least one support strut is connected to the false shoulder. A waist belt comprising a relatively rigid portion to which the at least one support strut is attached, the belt adapted to extend and secure about a waist of a camera operator.

In one embodiment, the apparatus has a first support strut and a second support strut, each strut connected to the false shoulder on one end and to the waist belt on the other end. At least one support strut may be adjustable in length, to accommodate users of different sizes and length preferences. In an alternative embodiment, the apparatus has three or more support struts.

Other optional features of embodiments of the invention, which may be incorporated alone or in combination with another, are many. The upper surface of the false shoulder and/or the inner surface may be padded. The upper surface of the false shoulder may resist slippage of a camera resting thereupon. The waist belt may optionally comprise padding. The apparatus may include an optional torso strap, to secure the apparatus about the torso for stability.

In one approach, at least one support strut is resilient. The at least one support strut may act as a shock absorber, to protect the shoulder of the user and/or to help keep the camera steady despite up-and-down or other motion of the body.

Again, the inventive concept includes variations, and the optional features noted above may be added to embodiments of the invention, either alone or in various combinations as appropriate.

DETAILED DESCRIPTION

The present invention seeks to disperse the weight of a shoulder-mounted camera away from the back and onto the lower portion of the operator's body. For example, in one embodiment of the invention, much of the weight of the camera assembly is transferred to the hips and legs. The load on the thoracic and lumbar of the back is reduced or eliminated, depending on the embodiment and/or the user's preference. Most embodiments will accommodate a variety of types and sizes of camera.

In one embodiment, an exoskeleton is created that extends over the operator's shoulder. A surface above the shoulder supports a camera that is typically not attached to the exoskeleton. In one embodiment, the structure of a camera-supporting rig has struts that come up one side of the body, over the shoulder, and down the other side of the body. The struts may be stabilized by one or more side middle straps to keep the rig from moving against body movement. The rig may include a mechanism for moving, extending, and collapsing the struts. It may also have at least one movable mid-strap to adjust the rig to a desired height, preferably without affecting the overall strut height. This allows for adjustments for different body types, and also allows for adjusting the height of the camera-supporting surface between takes or from shot to shot.

A sliding adjustment mechanism on the back of the rig may be provided to allow for changing the position of the rear strut, while keeping the rest of the system in place.

The top camera-supporting or "false shoulder" part may optionally be made available with a choice of different surfaces. In one embodiment, a resilient surface material is applied to the surface, for example. The resilient surface allows for a slight cradle for the bottom of a camera. The weight of the camera pushes down the padded surface, and allows for more stability by slightly grabbing sides of the camera, for example.

In one embodiment, there is also a slot in the top of at least one of the struts to allow adjustment of the camera-supporting surface of the false shoulder to hinge slightly towards or away from the operator, providing the operator the choice of a desired angle of the camera-supporting surface.

Figure 1:
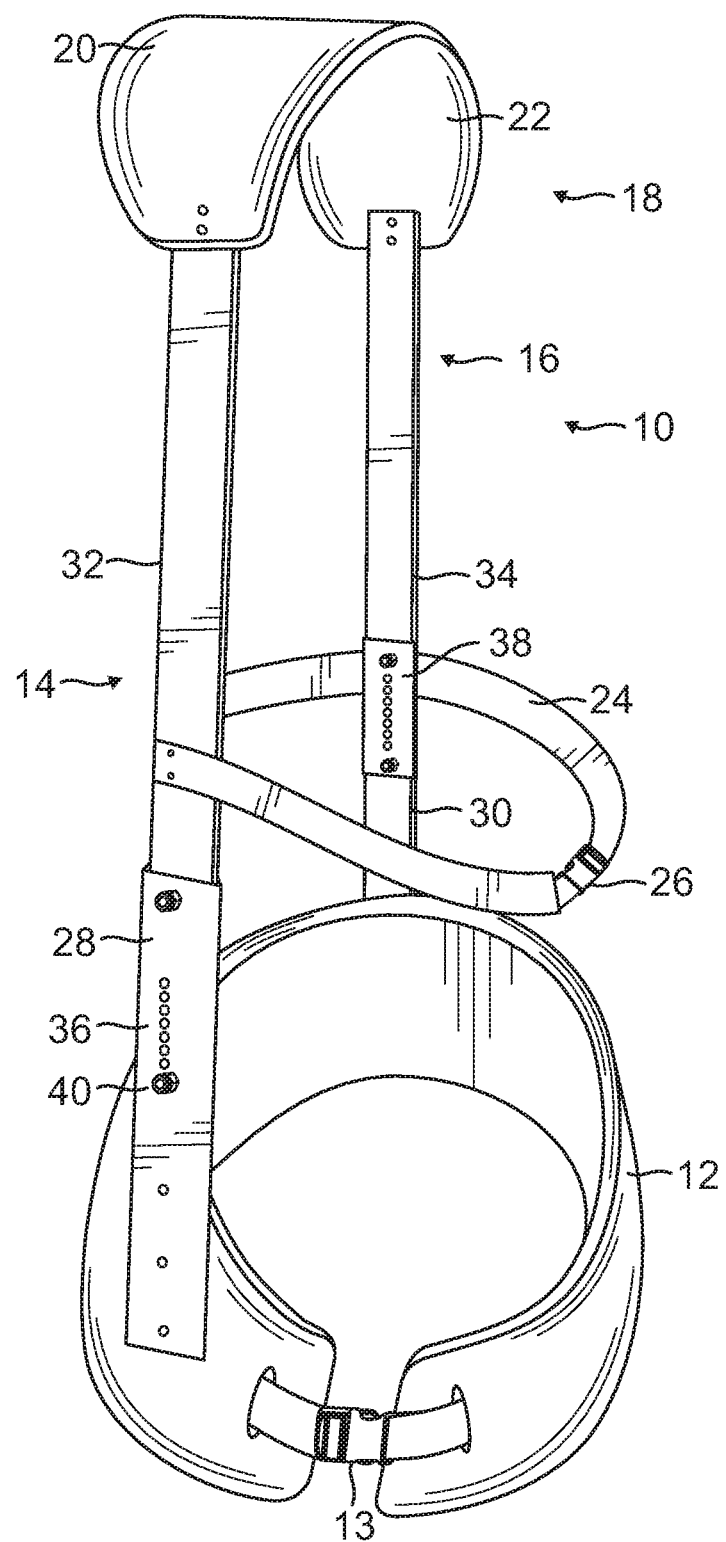
FIG. 1 illustrates an apparatus according to a first embodiment of the present invention.

Turning now to specific exemplary embodiments, in one embodiment, as shown particularly in FIG. 1, a system for supporting a video recording device and transferring the load 10 includes a padded waist belt 12 that attaches to two main support struts 14, 16. The waist belt may have a clasp closure 13, or other closure means known in the art such as, for example, a belt buckle. The belt 12 may be adjustable in size for different operator body types or comfort preferences. The belt may be made from any of a variety of materials, ranging from polymers to fabric to any other material known in the art for support belts. The belt may optionally be padded, as shown in FIG. 1, for user comfort.

The struts 14, 16 rise up and meet a piece of padded, curved material (a "false shoulder") 18 that rests above the operator's shoulder. This false shoulder 18 may have a base layer of a hard ridged or partially rigid plastic, carbon fiber, a composite material, or any suitable material. The shoulder may have an upper surface 20 on which a camera will rest, and an inner surface 22 which when the apparatus is mounted on the user, generally is situated a spaced distance above the user's actual shoulder (see FIG. 2). In one non-limiting embodiment, the spaced distance is just high enough to remove weight from the shoulder. This spacing can be adjusted by adjusting the height of one or more of the struts, for example, according to the operator's preference. The operator may decide how much contact (if any) they want between the false shoulder and their actual shoulder. This height adjustment can also be used to raise or lower the video/film recording device if the operator desires the shot to come from a higher or lower angle. In a presently-preferred use, the false shoulder will sit slightly above the operator's real shoulder, just high enough to take the weight off the shoulder, but low enough to let the operator feel a bit of contact with the rig, and thus the camera.

The apparatus may optionally include a strap 24 to extend around the torso of the user, which may have a clasp 26 or other securing means. The support struts 14, 16 may be adjustable in height, to account for different user heights. In one embodiment, each support bean has a respective lower strut 28, 30 and an upper strut 32, 34. Each upper/lower strut combination is interconnected, with a length adjustment mechanism 36, 38. One such mechanism as shown in FIG. 1 utilizes a series of openings and a resilient button (e.g. 40), which may be depressed to allow the upper and lower struts to move relative to one another before the button is allowed to extend through another opening to adjust the length. Alternatively, rather than using a resilient button, a nut/bolt combination may be employed. In another embodiment, the upper and lower struts could have horizontal ridges that line up with one another, allowing a tightening mechanism to hold them together, with the ridges supporting the struts together. This tightening mechanism could be easily opened and closed by the operator for fast adjustments of the length of the struts.

Figure 2:
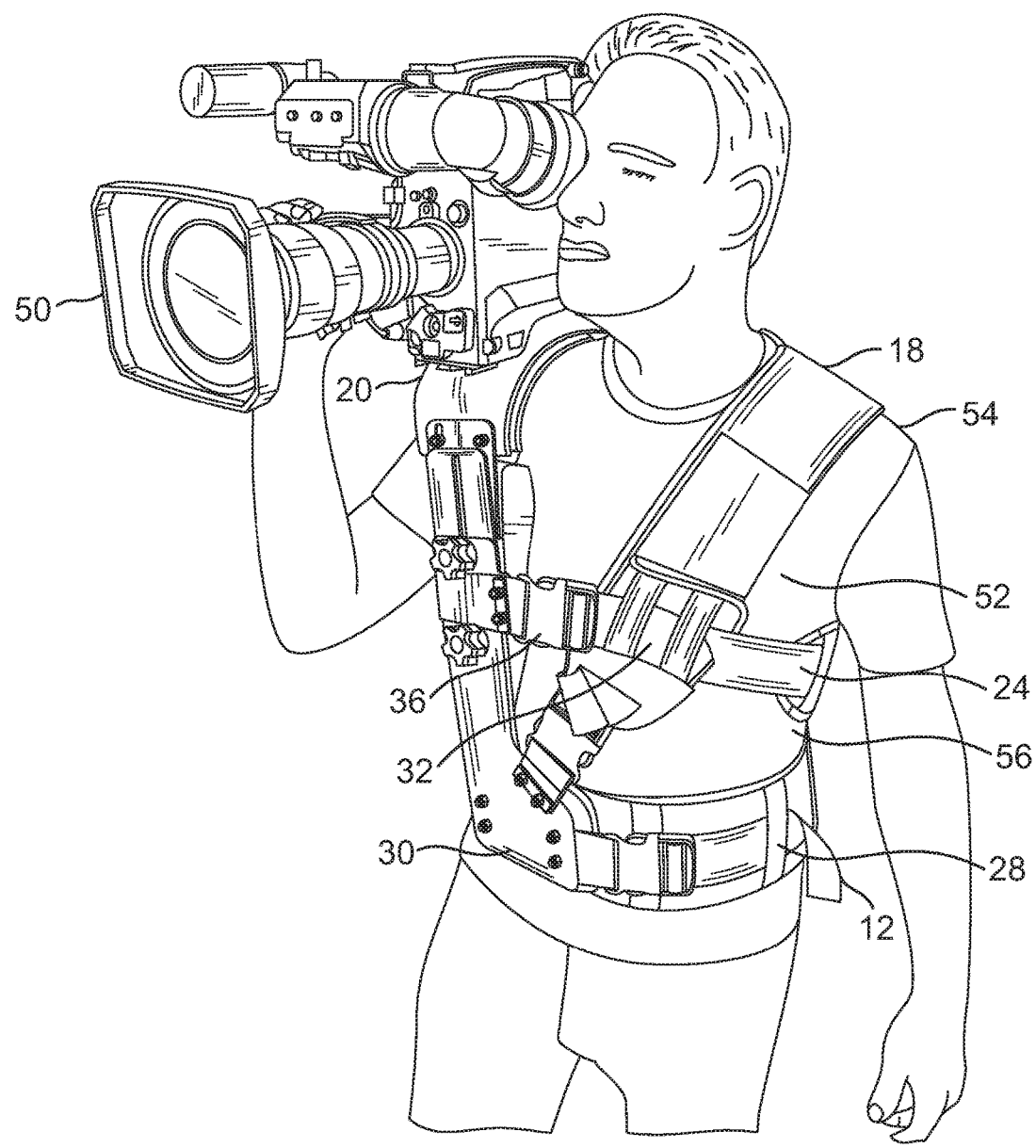
FIG. 2 illustrates a handheld professional video camera resting unattached atop a false shoulder of an embodiment of the present invention, as mounted on a simulated shoulder and torso.

Referring to the embodiment of FIG. 2, in use a camera 50 may rest against the upper surface 20 of the false shoulder. The camera 50 may optionally have, for example, one or more camera grips, as is common in many cases of handheld camera work, though not necessary or important in order to use the system for supporting a video/film recording device. For simplicity, FIG. 2 illustrates the torso 52 of an imaginary user, including an actual shoulder 54 and a waist 56, about which the belt 12 extends and to which it is secured. In a preferred embodiment, the camera 50 is not secured to the upper surface 20 of the shoulder, but simply rests upon it.

The upper surface 20 may have a texture and/or be made of a material that prevents the camera from slipping on the surface and/or to hug the base of the camera slightly. By not being secured to the upper surface 50 of the false shoulder, the camera may be quickly set down and/or taken off of the apparatus. In one embodiment, the top includes a layer of leather (or similar durable fabric) covering a thin pad atop a harder layer of support material.

Resting atop the false shoulder, the camera 50 may be easily repositioned, as desired, for the desired tilt/pan/roll at a given moment. FIGS. 3-6 illustrate a prototype of an embodiment of the present invention as it appears mounted on the upper body of a user.

The false shoulder may optionally be resilient and bend slightly when weight is applied, acting as a "shock absorber" when the operator is walking. The "shock absorber" may optionally include more specific and targeted shock absorption, such as by making the support struts more flexible, and/or by including a spring-based or hydraulic shock absorption system or the like. The false shoulder may be able to bend slightly when weight is applied for the purpose of fitting different shoulder/body sizes. In another embodiment, both the false shoulder and the struts could be completely rigid, and not flex or bend at all.

In an alternative embodiment, beneath the false shoulder, there may optionally be a pad to allow the false shoulder to contact the user's shoulder if desired for support or stability. The support struts may also have small pads on the back to allow for support contact with the operator's chest and/or upper back. These pads could be removable and adjustable as to where they lay on the struts and false shoulder to allow for maximum comfort for the operator.

In a presently preferred embodiment, the false shoulder will hover slightly above the operator's real shoulder, so that weight is transferred from the shoulder to the belt. Typically, the belt is adequately padded, possibly with removable/addable pads for the user to customize, and might also include a hard plastic outer or inner portion to which the support struts connect. This may help spread the load as evenly as possible on the belt. The belt may include a quick release mechanism that is easy to lock/unlock for fast and simple taking on and off. For a right-handed operator, the support rods may be stabilized under the operator's right arm with, for example, a fabric tension webbing that stays tight against the operator's right rib cage, or with a harder material, for example.

As discussed, in a presently preferred embodiment, the camera does not attach to the false shoulder. Instead, the camera is balanced atop the false shoulder by the operator, just as if it would be if the camera were on the operator's real shoulder. The operator is then free to pan, tilt, and/or roll the camera as if it were on his/her shoulder. He/she can also sit down, stand up, run, spin around, etc. as if he/she was doing regular handheld camerawork. Ideally, the system is compact and lightweight, so that the operator's movement is not hindered by a bulky apparatus.

Figure 3:
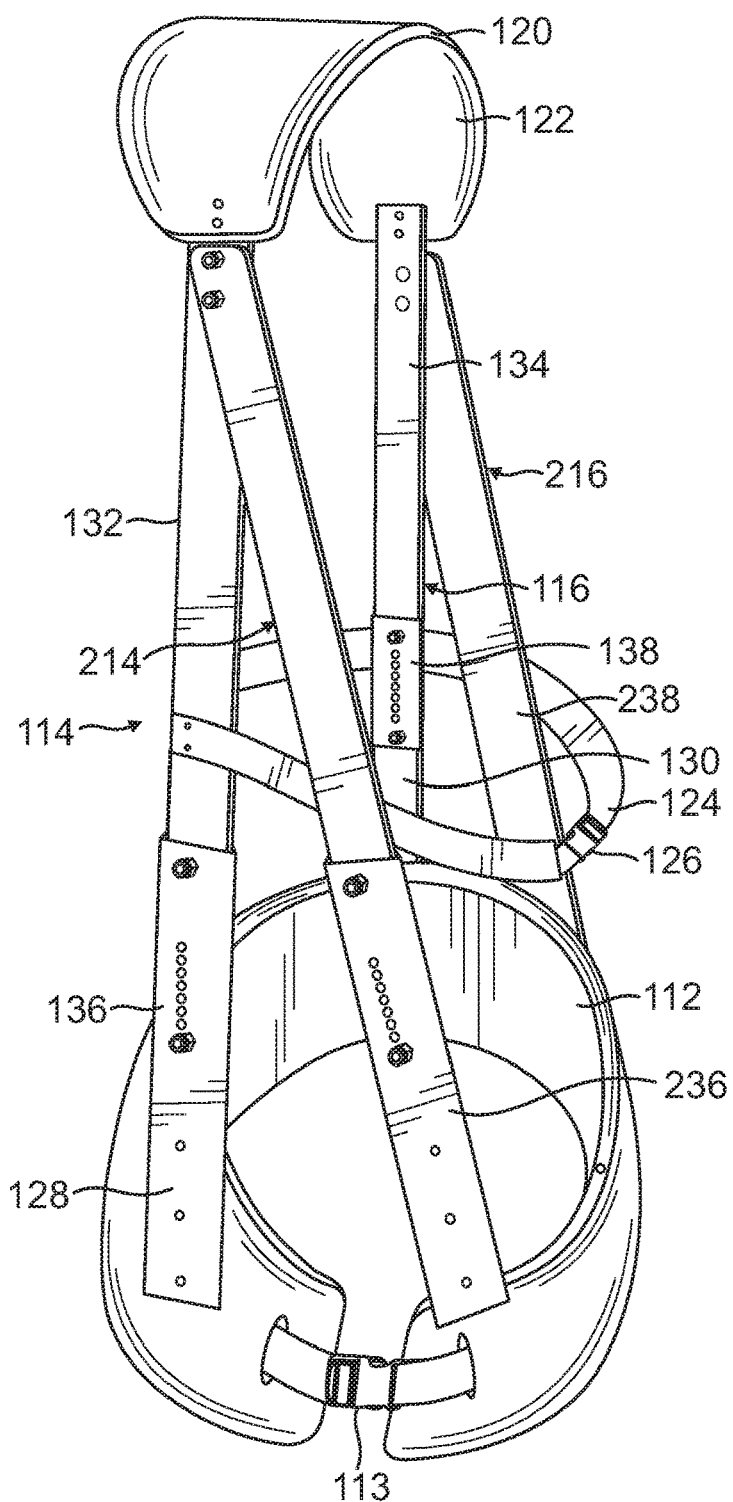
FIG. 3 illustrates a second embodiment of the present invention.

In an alternative approach illustrated in FIG. 3, additional support struts 214, 216 are added for heavier cameras and/or when the operator desires more support. For example, there may be two more support struts 214, 216 that connect to the false shoulder at or near the points that the main two support struts connect, at or near the false shoulder. These extra two struts 214, 216 serve to spread the weight out even more to the front left and back left of the belt. In a preferred embodiment, all four support struts 114, 116, 214, 216 have upper and lower struts, and can adjust length via length adjustment mechanisms 136, 138, 236, 238 that adjust, then lock into place to accommodate different camera weights, desired camera height, and operator body types. In one embodiment, the additional support struts may be added and removed by the user, to spread the wear and tear on an operator's body throughout the working day, as well as to allow the operator to add or remove supports based on the desired shot and body position needed.

While the presently-preferred application is to assist camera operators, the apparatus could also be applied to non-camera related work. Weight that is normally carried on a shoulder is transferred to the user's hips/legs. For example, construction workers may use the apparatus in carrying heavy objects such as a bag of cement or heavy construction material, to reduce the risk of back injury at work.

Various further modifications may be made, either alone or in combination with other optional features. The support struts could attach to the belt in a way that allows for quick and easy adjustment to the portion of the belt they connect with. The user could slide the struts left or right along the belt for user comfort and to accommodate different body sizes and types. After being adjusted they would be locked into place via a quick locking/unlocking mechanism. Alternatively, there could be multiple holes along the sides of the belt that accept screws to secure the support struts, but would allow the support struts to still be moved side to side along the belt.

Another optional feature is that additional support struts beyond two could be made of fabric (nylon or another suitable material) straps or webbing that are connected to the primary support struts and the belt in the same positions as illustrated with the additional support struts. These straps would be more flexible and quickly tightened/lengthened than the rigid support struts, and allow for a lighter overall weight of the apparatus.

In another embodiment, the false shoulder could include a lengthening mechanism to adjust to different operator's body types. There could be a sliding and locking mechanism in the middle of the false shoulder, for example, allowing the user to slide the front and back of the false shoulder apart or closer together, and then lock it in place. This would be adjustable from the bottom of the false shoulder, on top of the optional pad, where the pad would hide this mechanism when not in use. In an adjustable embodiment, the top of the false shoulder would have two surfaces, one directly on top of the other, which would slide flush, in order to revise without causing a bulge on the top surface when adjusted.

In a further alternative embodiment, both the front and back struts are wider overall, roughly 2.5" wide as one non-limiting example. The top of these vertical structures will flare out to 5", for instance, to mount the curved shoulder plate. The bottom will also flare out where it is attached to the belt. The back strut is adjustable as to where it sits on the belt to allow for customization to different body types. The rear vertical structure base will have a continual horizontal adjustment +/−4" for waist size adjustment relative to the front plate. There are removable pads that the operator can Velcro on the backs of both struts to fit between the structure and their body to provide padding, if desired. These struts both have two adjustable nobs that control the height adjustment of the struts.

In this embodiment, there is a piece of metal that sits in between the top and bottom metal plates that make up the strut. When the nobs are loosened, this middle metal plate is loosened, allowing the user to shorten or lengthen the strut, and tighten it back again at the desired length. The top and bottom parts that make up the vertical struts are slotted to allow this to slide up and down.

The midriff webbing strap may be wider and have slotted sliding plates and be adjustable via tri-glides to accommodate the size of the upper torso. There may be a shoulder strap that fits over the operator's left shoulder for added weight support and to help keep the rig in place relative to the operator's body. This is made of textured nylon and space mesh, and is removable through quick releases both in the front and back.

Non-limiting examples of materials for the waist belt include textured nylon and polyester spacer mesh—5" width with 1/8" and 1/16" polypropylene, 1" webbing to contain belt—horizontal 1/2" bubbled accessory webbing, and buckle hardware. The waist belt may be 5" wide, for example, and come in different sizes (small, medium and large, for instance). Accessory webbing loops may be on the belt, to allow the user to clip things like a phone case, walkie talkie, or other accessory to the belt.

The curved shoulder support "false shoulder" plate may have a heavy saddle leather surface, for example. Optionally, it may also include a crescent shaped cut-out to accommodate the operator's neck. The camera-supporting surface may also include a side to side tilt adjustment. The foregoing features of this alternative embodiment may be implemented either alone or in combination as described.

Figure 4:
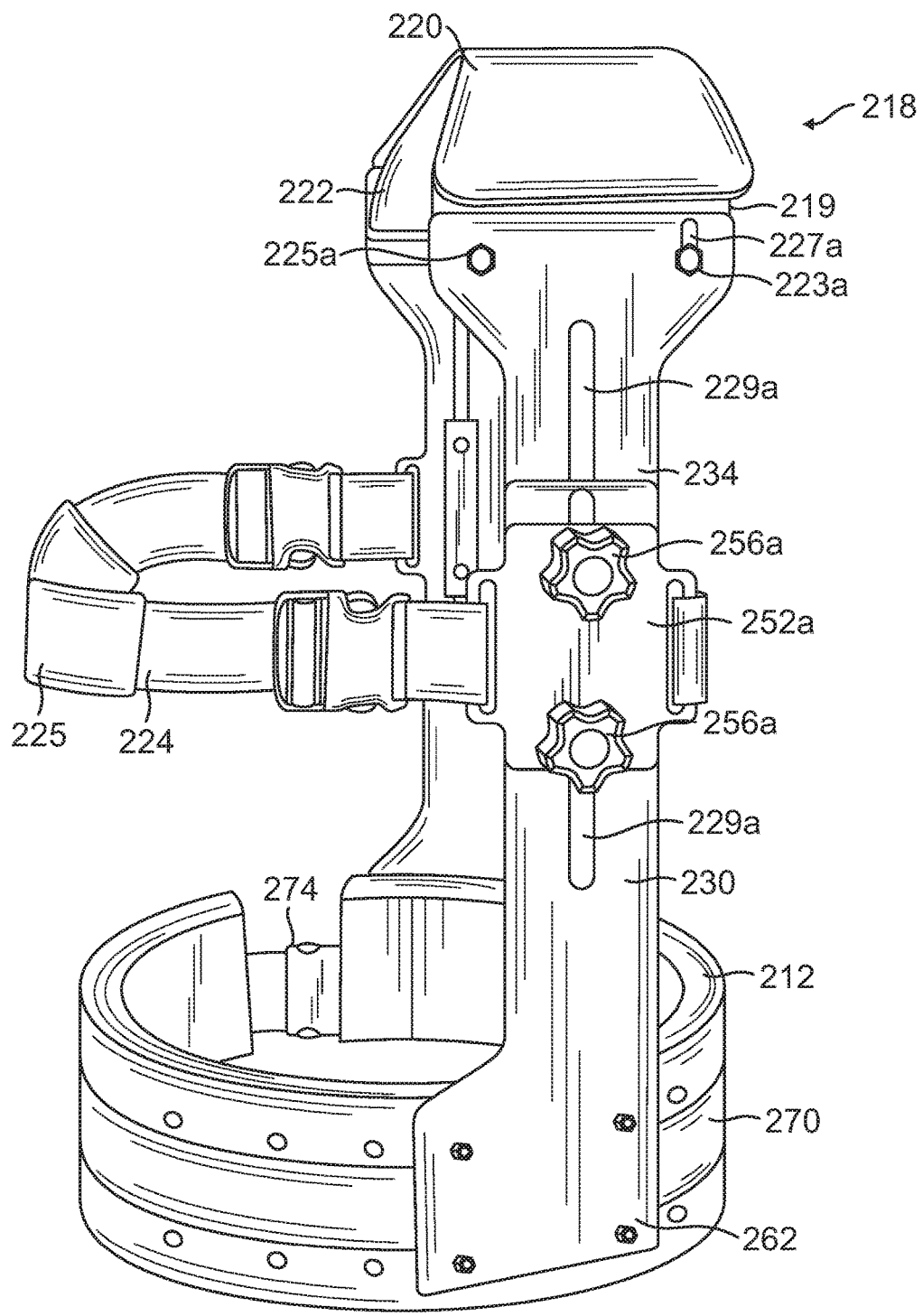
FIGS. 4 and 5 illustrate a third embodiment of the present invention.
Figure 5:
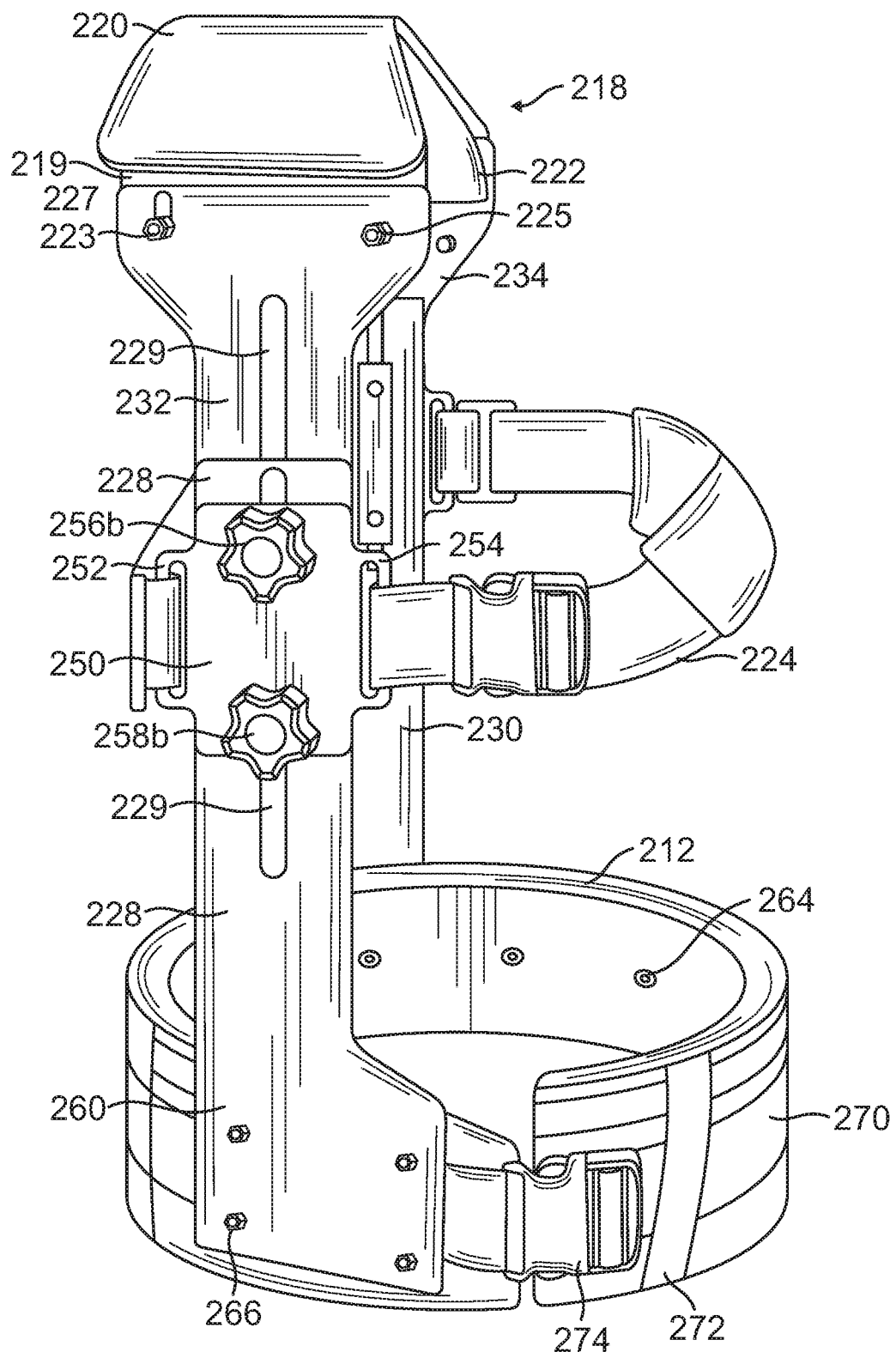

Considering now an additional embodiment, FIGS. 4 and 5 illustrate another embodiment that has upper struts 232, 234 and lower struts 228, 230 that slide relative to one another to adjust the height of a false shoulder 218, on which a camera will rest without being secured to the false shoulder. In this embodiment, the false shoulder 218 includes a padded upper surface 220. The pad may be secured to the false shoulder structure 219 via hook-and-loop material such as Velcro. A variety of pads of different materials, stiffnesses, and dimensions may be provided. A variety of pads may also be provided for the inner surface 222 of the false shoulder and selectively attached with hook-and-loop material or other attachment means.

The false shoulder structure 219 is typically a molded polymer, such as ABS plastic for example, that may flex somewhat when a camera is placed atop the padded upper surface 220. The false shoulder structure may have a thickness selected by the designer for specific camera weights, desired flexibility, and/or other design factors.

The false shoulder structure 219 is secured to upper struts 232 and 234, respectively, with nut-and-bolt fasteners 223, 225 or other suitable fasteners. At least one slot may be provided in conjunction with at least one fastener. For example, slot 227 permits the location of fastener 223 to be adjusted, so that the false shoulder 218 may be tilted, as desired. The tilt may effect the angle at which the camera is directed.

As seen, the upper struts 232, 234 have relatively narrow neck portions that flair outwardly to form a wider upper portion at which the false shoulder 218 is bolted to the upper struts.

Figure 6:
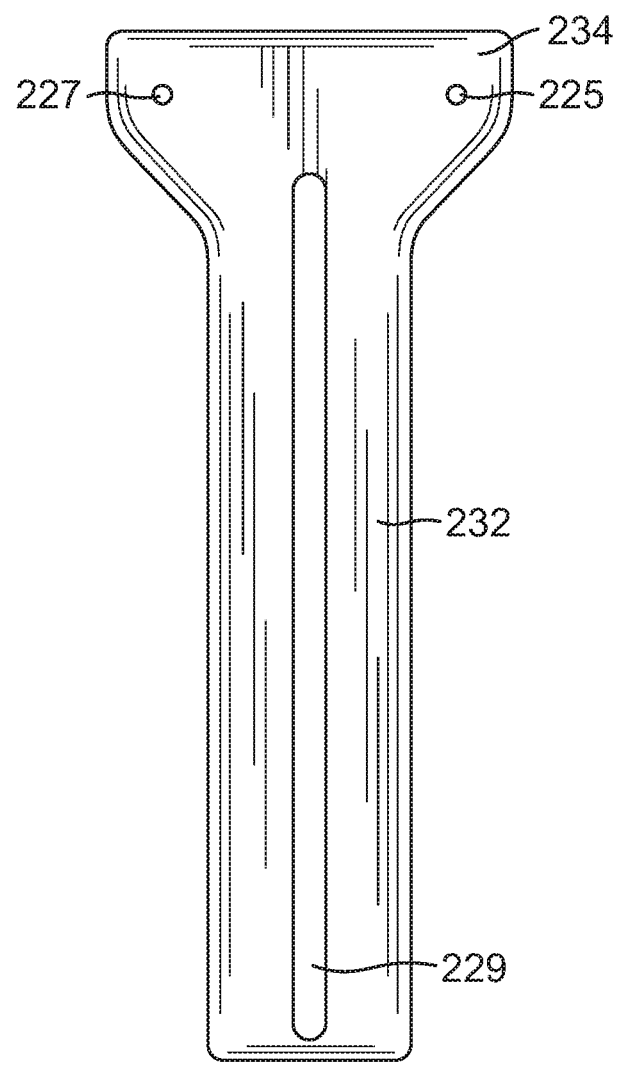
FIGS. 6-8 illustrate individual components of the side support structure of the embodiment of FIGS. 4 and 5.

The assembly also includes lower struts 228, 230, which are separate pieces from upper struts 232, 234. FIG. 6 illustrates an upper strut 232 in isolation. In this embodiment, the strut is about 5 inches at its widest, and about 2½ inches at its long neck. The central slot is approximately 11 inches long and may be from ¼ inch to ¾ inch wide.

Figure 7:
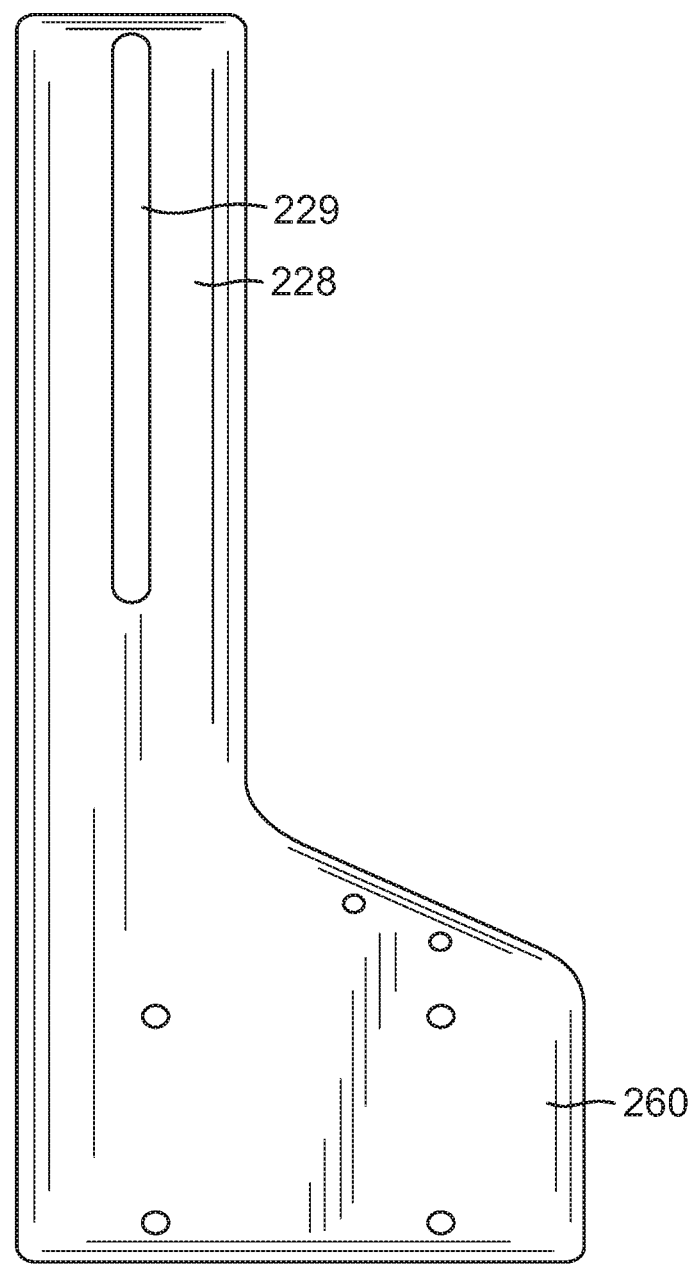

FIG. 7 illustrates a lower strut 228 in isolation. In this embodiment, the lower strut is about 16 inches long, with a slot of approximately 8 inches. The neck portion may be about 10.5 inches long, with the wider base being about 5.5 inches in total length and 6 inches at its widest point. Oh course, other dimensions may be used, depending on the design.

Figure 8:
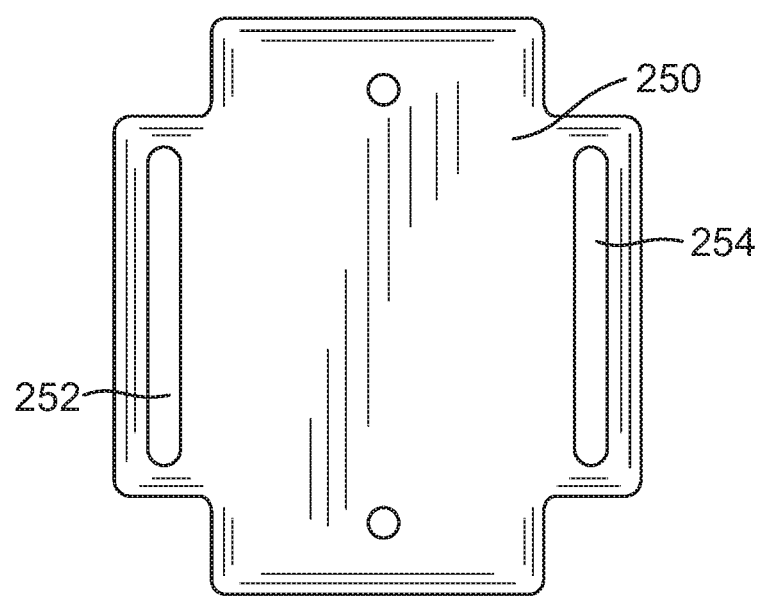

FIG. 8 illustrates a torso strap plate 250 in isolation. The torso plate includes slots through which the strap may loop, each slot being approximately 3 inches in diameter, with the ear through which the slots extend being approximately ¾ inch in width. The main body of the plate is approximately 21 inches wide, with the plate being about 41 inches long.

Referring back to FIG. 5, each of the upper struts 232, 234 has a respective longitudinal slot, and each of the lower struts 228, 230 has a corresponding longitudinal slot. Adjustment knob assemblies 256 and 258 interconnect the upper and lower struts, through the respective slots. When the adjustment knobs are loosened, the upper strut is free to slide relative to the lower strut. This permits the false shoulder to be raised or lowered, as desired. So, for example, with the knobs loosened, the upper strut may slide toward or away from the lower strut, thereby increasing or decreasing the overall length of the strut structure.

A torso strap plate 250 can also slide relative to the lower and upper struts, to adjust the height of the torso strap 224. The torso strap plate 250 also includes strap supports 252 and 254, through which torso strap 224 may be threaded and secured. When the user has adjusted the height of the false shoulder 218 to the desired height, and has adjusted the torso strap plate 250 to a desired height, the knobs are turned to tighten and to lock the pieces in place. Women, for example, can adjust the mid-rift strap above or below their chest for desired comfort by adjusting the torso plate 250 higher or lower in terms of where it sits on the struts. This can be done without affecting the height of the false shoulder.

Lower left struts 228, 230 each have a lower attachment plate. In FIG. 5, lower attachment plate 260 attaches to the reinforced waist belt 212. The waist belt 212 includes a molded polymer frame, typically polypropylene as one example, covered with foam padding. The thickness of the molded polymer may be chosen for desired structural properties. The molded polymer may include threaded eyelets embedded therein through which a bolt/nut assembly may be secured. Consequently, FIG. 5 illustrates lower attachment plate 260 bolted and secured to reinforced waist belt 212.

FIG. 5 illustrates rivets 264. These are rivets that secure both sides of the padding to the interior support frame. The rivets help maintain the shape of the waist belt as weight is applied to it, and prevents the padding and interior support frame from separating.

As seen, the waist belt includes a clasp, the length of which can be adjusted. Similarly, the torso strap may be adjustable in length. Various other pads may be provided, such as for placing on the inside of the struts or elsewhere on the apparatus. A reverse coil zipper may be used at the waist, to not dig into the operator's waist. Various hardware may be optionally secured to the belt, with a securing portion of the hardware going all the way through the hard plastic inner structure, anchoring everything to it to keep the material from sliding/rotating on/around the inner harder structure of the belt when weight is put on the rig, and pressing down against an operator's body. (see, e.g., eyelets 264 on FIG. 5).

The system may include a belt extension option. A removeable/addable portion of the belt that can slide on the existing main nylon strap on the belt when it is extended longer than the existing belt. So, for example, a floating extra 5" or so piece of belt can be added if needed for more padding when the belt is extended for a larger user.

In view of the many possible embodiments to which the principles of the disclosed invention may be applied, it should be recognized that the illustrated embodiments are only preferred examples of the invention and should not be taken as limiting the scope of the invention.

What is claimed is:

1. An apparatus for providing a false shoulder to bear the weight of a handheld camera and transferring at least some of the camera weight to the hips and legs of a user comprises:
    a frame having a plate defining a false shoulder when mounted on a user, the false shoulder having an upper surface and a lower surface, the false shoulder being adapted to support a camera resting on an upper surface of the false shoulder without the camera being secured to the false shoulder;
    first and second support struts connected to the false shoulder, wherein each of the first and second support struts comprise an upper portion and a lower portion, the upper portion being slidable relative to the lower portion in order to adjust the length of each strut;
    a waist belt comprising a relatively rigid portion to which the at least one support strut is attached, the belt adapted to extend and secure about a waist of a camera operator;
    the apparatus comprising a first support strut and a second support strut, each strut connected to the false shoulder on one end and to the waist belt on the other end, at least one strut being adjustable in length;
    a pad on the upper surface of the false shoulder;
    the apparatus further comprising a torso strap in between the waist belt and the false shoulder;
    one of the struts being adjustable as to where it attaches to the belt to allow for customization to fit different body types; and
    releasable locks adapted to be unlocked to permit adjustment of the length of the struts;
    wherein the upper surface of the false shoulder is adapted to have an adjustable lateral angle.

2. An apparatus for providing a false shoulder to bear the weight of a handheld camera and transferring at least some of the camera weight to the hips and legs of a user comprising:
    a frame providing a false shoulder when mounted on a user, the false shoulder having an upper surface and a lower surface, the false shoulder being adapted to support a camera resting on an upper surface of the false shoulder without the camera being secured to the false shoulder;
    at least one support strut connected to the false shoulder; and
    a waist belt to which the at least one support strut is attached, the belt adapted to extend and secure about a waist of a camera operator.

3. An apparatus as defined in claim 2, in which the apparatus has a first support strut and a second support strut, each strut connected to the false shoulder on one end and to the waist belt on the other end.

4. An apparatus as defined in claim 3, in which the struts are adjustable in length.

5. An apparatus as defined in claim 2, in which the apparatus has three or more support struts.

6. An apparatus as defined in claim 2 in which the upper surface of the false shoulder is padded.

7. An apparatus as defined in claim 2 in which the apparatus further comprises a torso strap in between the waist belt and the false shoulder.

8. An apparatus as defined in claim 2 in which the inner surface of the false shoulder is padded.

9. An apparatus as defined in claim 2 in which the at least one support strut is resilient and is adapted to absorb shock.

10. An apparatus as defined in claim 3, wherein:
the first and second struts are roughly 2.5" wide in a middle portion, flaring to approximately 5" wide at bottom and top ends to attach to the belt and to the false shoulder, respectively;
one of the struts being adjustable as to where it attaches to the belt to allow for customization to fit different body types.

11. An apparatus as defined in claim 3, wherein the apparatus further comprises:
adjustable locking nobs adapted to be loosened to permit the adjustment of the length of the struts.

12. An apparatus as defined in claim 3, further comprising webbing loops on the belt, to allow the user to clip at least one accessory to the belt.

13. An apparatus as defined in claim 3, wherein the plate defining the false shoulder includes a cut-out to accommodate an operator's neck and a side to side tilt adjustment.

14. An apparatus as defined in claim 3, wherein the upper surface of the false shoulder is adapted to have an adjustable lateral angle.

15. An apparatus as defined in claim 3, wherein each of the first and second support struts comprise an upper portion and a lower portion, the upper portion being slidable relative to the lower portion in order to adjust the length of each strut.

16. An apparatus for providing a false shoulder to bear the weight of a handheld camera and transferring at least some of the camera weight to the hips and legs of a user comprises:
a frame having a false shoulder when mounted on a user, the false shoulder having an upper surface and a lower surface, the false shoulder being adapted to support a camera resting on an upper surface of the false shoulder without the camera being secured to the false shoulder;
first and second support struts connected to the false shoulder, wherein each of the first and second support struts comprise an upper portion and a lower portion, the upper portion being movable relative to the lower portion in order to adjust the length of each strut;
a waist belt comprising a relatively rigid portion to which the at least one support strut is attached, the belt adapted to extend and secure about a waist of a camera operator;
the apparatus further comprising a torso strap in between the waist belt and the false shoulder;
one of the struts being adjustable as to where it attaches to the belt to allow for customization to fit different body types; and
releasable locks adapted to be unlocked to permit adjustment of the length of the struts;
wherein the upper surface of the false shoulder is adapted to have a surface angle that is adjustable.

* * * * *